(12) United States Patent
Leight et al.

(10) Patent No.: US 6,587,256 B2
(45) Date of Patent: Jul. 1, 2003

(54) RF COMBINER BASED ON CASCADED OPTICAL PHASE MODULATION

(75) Inventors: James E. Leight, San Ramon, CA (US); David L. Rollins, Woodinville, WA (US); Richard A. Fields, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 93 days.

(21) Appl. No.: 09/876,017

(22) Filed: Jun. 6, 2001

(65) Prior Publication Data

US 2002/0186445 A1 Dec. 12, 2002

(51) Int. Cl.[7] .............. G02F 1/29; G02F 1/01; G02F 1/03; G02F 1/035
(52) U.S. Cl. ............ 359/316; 359/279; 359/245; 385/2; 385/3
(58) Field of Search ................ 359/237, 238, 359/240, 245, 259, 278, 279, 145, 115, 124, 175, 316; 342/368; 385/3, 2, 4

(56) References Cited

U.S. PATENT DOCUMENTS

| | | | |
|---|---|---|---|
| 5,168,534 A | * 12/1992 | McBrien et al. | 385/3 |
| 5,710,651 A | * 1/1998 | Logan, Jr. | 359/145 |
| 5,859,611 A | * 1/1999 | Lam et al. | 342/368 |
| 6,201,632 B1 | * 3/2001 | Rollins | 359/259 |

* cited by examiner

*Primary Examiner*—Evelyn Lester
*Assistant Examiner*—Gary O'Neill
(74) *Attorney, Agent, or Firm*—Warn, Burgess & Hoffman, P.C.

(57) ABSTRACT

An RF combiner (10) that combines a plurality of RF signals (12) in the optical domain. The combiner (10) includes a single optical source (14) that generates an optical beam (16). The optical beam (16) is directed through a series of optical modulators (20), such as optical phase modulators. Each modulator (20) is responsive to an RF signal (12) that is to be combined with the other RF signals (12). Each modulator (20) modulates the optical signal (16) with the RF signal (12) so that the modulations combine in an additive manner. A single optical phase demodulator (32) is used to demodulate the composite phase modulated optical beam (16) to generate the combined RF signal (34). Suitable delay devices (50) can be used between the optical modulators (20), or the RF signals can be matched so that the RF signals combine in phase.

18 Claims, 1 Drawing Sheet

RF COMBINER BASED ON CASCADED OPTICAL PHASE MODULATION

BACKGROUND OF THE INVENTION

1. Field of the Invention

This invention relates generally to an optical modulator for combining RF signals and, more particularly, to an optical phase modulation system including a single optical source and a series of optical phase modulators each receiving a separate RF signal, where the phase modulators operate to combine the RF signals.

2. Discussion of the Related Art

Various systems exist that require the need to combine two or more RF signals. For example, phased array antennas that are used to increase signal strength reception at certain frequencies require that the RF signal received by each antenna element in the array be combined in phase with each other. Various RF signal combiners are known in the art for providing RF signal combination for these types of systems. One known RF signal combiner is the Wilkinson power combiner that combines the RF signals in stages of two signals. The Wilkinson power combiner suffers from the drawback that the number of RF inputs must be known or the combiner will suffer from efficiency losses. Also, the Wilkinson power combiner operates completely in the RF domain, thus making it not applicable for those systems that make use of the optical domain for signal processing.

With the increased use of optical systems to increase signal speed and information transmission, it is becoming increasingly more important to provide RF combining in the optical domain. Various RF signal combiners that employ RF modulation of an optical signal can be used. For example, wavelength division multiplexing (WDM) of unique wavelengths of light has been used to separately modulate several RF signals. In WDM, separately modulated light beams, each having a unique wavelength, are multiplexed into a single fiber or optical waveguide. A single photodetector is then used to both demodulate the individual intensity modulated laser wavelengths and simultaneously and coherently combine them.

In a different optical design, intensity modulation of a single laser beam by the multiple RF signals can be done to provide the RF combining. However, intensity modulating a light beam with an RF signal creates distortion, making the modulation power inefficient. Also, intensity modulation requires excessive laser power to give high dynamic range for phased array antenna applications.

The WDM technique described above requires several lasers operating at different wavelengths. Intensity modulation schemes suffer from distortions. It is desirable to reduce the complexity of an RF combiner by employing a single laser source at a single frequency, and that does not require intensity modulation of the light. It is therefore an object of the present invention to provide such an RF combiner.

SUMMARY OF THE INVENTION

In accordance with the teachings of the present invention, an RF combiner is disclosed that combines a plurality of RF signals in the optical domain. The combiner includes a single optical source that generates an optical beam. The optical beam is directed through a series of optical modulators, such as optical phase modulators. Each modulator is responsive to an RF signal that is to be combined with other RF signals. Each modulator modulates the optical signal with the RF signal so that the modulations combine in an additive manner. A single optical phase demodulator is used to demodulate the composite phase modulated optical signal to generate the combined RF signal. Suitable delay devices can be provided between the optical modulators, or the RF signals can be matched, so that the RF signals combine in phase.

Additional objects, advantages and features of the present invention will become apparent to those skilled in the art from the following discussion and the accompanying drawings and claims.

DETAILED DESCRIPTION OF THE PREFERRED EMBODIMENTS

The following discussion of the preferred embodiments directed to an optical combiner for combining RF signals in the optical domain is merely exemplary in nature, and is in no way intended to limit the invention or its applications or uses.

Figure 1:
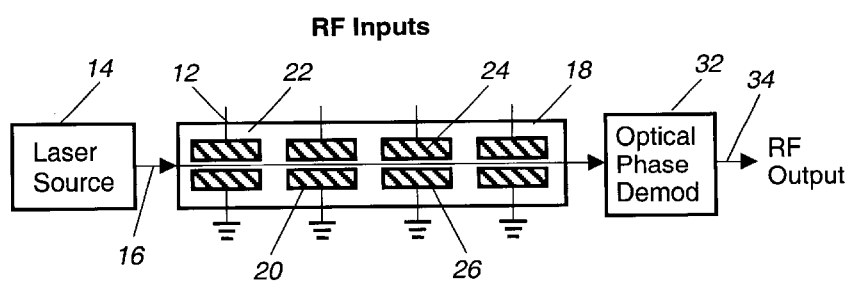
FIG. 1 is a schematic plan view of an RF combiner for combining RF signals in the optical domain, according to an embodiment of the present invention.

FIG. 1 is a schematic plan view of an RF combining system 10 that combines a plurality of RF input signals 12 in the optical domain, according to an embodiment of the present invention. The system 10 includes an optical source 14 that generates an optical beam 16. The optical source 14 can be any optical source or laser source suitable for the purposes described herein. One advantage of the present invention, as will be described below, includes modulating a single optical beam with the several RF signals 12. The optical beam 16 would propagate through the system 10 within a suitable optical waveguide or fiber optic cable (not shown).

The system 10 includes a bank 18 of optical phase modulators 20 configured in series so that they receive the optical beam 16 in succession. The modulators 20 can be any electro-optic phase modulator, such as the well known straight waveguide lithium niobate or semiconductor electro-optic modulators, suitable for the purposes described herein. The phase modulators 20 can be very small when made from semiconductor materials, such as InP and GaAs, and can be integrated with driving RF amplifiers on the same chip. The beam 16 propagates through an optical medium 22 having a particular index of refraction in each modulator 20. Each modulator 20 includes opposing electric plates 24 and 26 that receive the RF input signal 12 and create an electric field across the medium 22. The electric field changes the index of refraction of the medium 22 that causes the optical beam 16 to either speed up or slow down as it propagates therethrough. If the RF signal is positive, the beam 16 will either speed up or slow down depending on how it changes the index of refraction of the medium 22, and if the RF signal is negative, the beam 16 will have the opposite effect on this index of refraction. The modulators 20 are straightforward in design, and require no bias voltage or control. In this embodiment, there are four modulators 20, but, as would be appreciated by those skilled in the art, any appropriate number of modulators can be used within the scope of the present invention.

The particular design of the system and the medium used would determine how the index of refraction of the medium 22 would change from the electric field, and thus how it would effect the propagation of the beam 16. The greater the electric field, the more the index of refraction of the medium 22 would change, and thus the more the propagation speed of the beam 16 would be effected. The system 10 would probably be designed so that the RF signal would cause the index of refraction of the medium 22 to change in a linear manner, but this is not necessary. The speeding up or slowing down of the beam 16 creates a phase modulation of the beam 16 that adds from modulator to modulator in a linear manner.

The RF and optical signals to each modulator 20 must be matched for phase matching purposes, but only on the time scale of the RF frequencies, not on the time scale of the optical carrier frequency. Thus, RF coherence must be maintained between the phase modulators 20, but not optical coherence. Slow phase shifts introduced by temperature variations in the optical waveguides and optical fibers are of little concern because these effects result in an additive low frequency noise that can be filtered out. One possible concern is that phase modulation is more sensitive to laser phase noise than intensity modulation. However, because only one optical source is required, more care can be taken to ensure that the laser phase noise does not degrade the noise floor.

To provide the necessary RF delay for phase matching purposes, suitable optical delay devices can be provided. The delay device can delay the optical beam 16 so that when the beam 16 reaches the next modulator 20, it will be aligned in time with the modulation from that RF signal. Therefore, the additive effect of all of the modulations generates a coherently combined signal. In an alternate embodiment, RF delay devices (not shown) can be employed to delay the RF input signals 12 before being applied to the modulators 20 to provide coherence.

The modulated optical beam 16 is applied to an optical phase demodulator 32 to demodulate the optical phase and provide a combined RF output signal 34. Any optical demodulator suitable for the purposes described herein can be used. Optical demodulators are typically much more difficult to implement than optical modulators, but phase demodulators have good signal-to-noise ratio and dynamic range performance potential. One demodulator that can be used herein is disclosed in U.S. patent application Ser. No. 09/322,288, filed May 28, 1999, titled Feed Forward Optical Frequency/Phase Demodulator, assigned to the assignee of this application and herein incorporated by reference.

Figure 2:
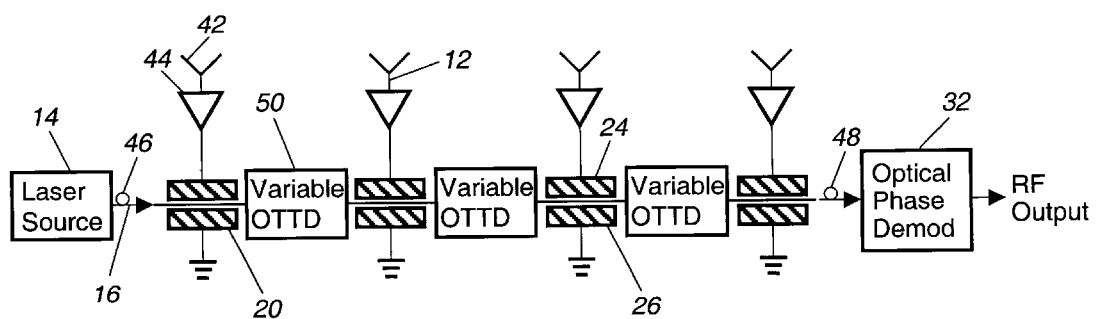
FIG. 2 is a schematic plan view of a more detailed RF combiner for combining RF signals in the optical domain, according to another embodiment of the present invention.

FIG. 2 is a schematic plan view of another RF combining system 40 that provides more detail than the combining system 10 discussed above, according to another embodiment of the present invention. In FIG. 2, like components to those of the combining system 10 as discussed above are identified with the same reference numeral, and operate in the same manner. The combining system 40 is used in connection with a phased array antenna including a plurality of antenna elements 42. RF amplifiers 44 are provided in combination with each antenna element 42 to amplify the received RF signals to be suitable for RF signal processing. Additionally, each of the phase modulators 20 are separated from the bank 18 as individual modulating devices. As above, the amplified RF signal 12 is applied to the electrical plates 24 and 26 in each modulator 20 to create an electrical field across the optical medium 22 to change the index refraction of the medium 22 to phase modulate the optical beam 16. A length of fiber 46 is provided between the laser source 14 and the first modulator 20 to show that the laser source 14 can be remote from the modulators 20. Likewise, a length of fiber 48 is provided between the last modulator and the demodulator 32 to show that the demodulator 32 can be remote from the modulators 20.

As mentioned above, it may be necessary to provide optical delay devices between the modulators 20 to align the RF signals 12 in phase. To provide this delay, a variable optical true time delay device (OTTD) device 50 is provided between each phase modulator 20 to delay the optical beam 16 so that the RF signal modulated thereon is aligned in phase with the RF signal at the next stage. The devices 50 can be any suitable delay device, as would be appreciated by those skilled in the art. For example, the OTTD devices 50 can include optical switches that are controlled in a variable manner that act to direct the optical beam down different optical paths within the device 50 to delay the optical signal accordingly.

The invention as described above provides a technique for linearly combining RF input signals to give an intermediate optical output signal. The optical signal used is suitable for transmission over a fiber or a free space link before demodulating to produce the combined RF signal 34. Since the optical signal is a single wavelength signal, it can be multiplexed with other single wavelength optical signals, using WDM multiplexers, to more efficiently use the fiber or free space link.

Phase modulated optical links potentially have a better dynamic range and sensitivity than intensity modulated optical links. Only a single laser is needed so that the number of RF input signals is not limited by the number of optical wavelengths available. Also, only a single demodulator is required. Modulator complexity is reduced and linearity is increased compared to intensity modulation.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A system for combining a plurality of RF input signals, said system comprising:
   an optical source, said optical source generating an optical carrier wave;
   a series of optical modulators, each of the optical modulators being responsive to the optical carrier wave in a successive manner, each modulator further being responsive to a different one of the plurality of RF input signals, each modulator modulating the carrier wave with the RF input signal where successive modulators create a modulation of the combination of the RF input signal applied to the current modulator and the RF input signals applied to the preceding modulators; and
   an optical demodulator, said demodulator being responsive to the carrier wave after being modulated by the series of modulators, said demodulator generating an RF output signal that is a sum of the RF input signals.

2. The system according to claim 1 wherein the optical modulators are optical phase modulators and the optical demodulator is an optical phase demodulator.

3. The system according to claim 1 wherein the optical modulators are electro-optic phase modulators.

4. The system according to claim 1 wherein the optical modulators are semiconductor electro-optic intensity modulators.

5. The system according to claim 1 wherein the optical modulators are Electro Absorption intensity and phase modulators.

6. A system for combining a plurality of RF input signals, said system comprising:
- an optical source, said optical source generating an optical carrier wave;
- a series of optical modulators, each of the optical modulators being responsive to the optical carrier wave in a successive manner, each modulator further being responsive to a different one of the plurality of RF input signals, each modulator modulating the carrier wave with the RF input signal where successive modulators create a modulation of the combination of the RF input signal applied to the current modulator and the RF input signals applied to the preceding modulators the RF input signals being delayed in time so that they arrive at their respective modulators such that the modulation imposed by any given modulator matched in time with the modulation imposed by all other modulators; and
- an optical demodulator, said demodulator being responsive to the carrier wave after being modulated by the series of modulators, said demodulator generating an RF output signal that is a sum of the RF input signals.

7. A system for combining a plurality of RF input signals, said system comprising:
- an optical source, said optical source generating an optical carrier wave;
- a series of optical modulators, each of the optical modulators being responsive to the optical carrier wave in a successive manner, each modulator further being responsive to a different one of the plurality of RF input signals, each modulator modulating the carrier wave with the RF input signal where successive modulators create a modulation of the combination of the RF input signal applied to the current modulator and the RF input signals applied to the preceding modulators;
- a plurality of delay devices, positioned between the modulators to provide RF phase matching; and
- an optical demodulator, said demodulator being responsive to the carrier wave after being modulated by the series of modulators, said demodulator generating an RF output signal that is a sum of the RF input signals.

8. The system according to claim 7 wherein the delay devices are variable optical true time delay devices.

9. A system for combining a plurality of RF input signals, said system comprising:
- a laser source for generating a laser beam;
- a series of optical phase modulators, each of the optical modulators being responsive to the laser beam in a successive manner, each modulator further being responsive to a different one of the plurality of RF input signals, each modulator modulating the laser beam with the RF input signal where successive modulators create a modulation of the combination of the RF input signal applied to the current modulator and the RF input signals applied to the preceding modulators; and
- a single optical phase demodulator, said demodulator being responsive to the laser beam after being modulated by the series of modulators, said demodulator generating an RF output signal that is a sum of the RF input signals.

10. The system according to claim 9 wherein the optical modulators are electro-optic phase modulators.

11. The system according to claim 9 wherein the optical modulators are semiconductor electro-optic intensity modulators.

12. The system according to claim 9 wherein the optical modulators are Electro Absorption phase and intensity modulators.

13. A system for combining a plurality of RF input signals, said system comprising:
- a laser source for generating a laser beam;
- a series of optical phase modulators, each of the optical modulators being responsive to the laser beam in a successive manner, each modulator further being responsive to a different one of the plurality of RF input signals, each modulator modulating the laser beam with the RF input signal where successive modulators create a modulation of the combination of the RF input signal applied to the current modulator and the RF input signals applied to the preceding modulators;
- a plurality of delay devices positioned between the modulators to provide RF phase matching; and
- a single optical phase demodulator, said demodulator being responsive to the laser beam after being modulated by the series of modulators, said demodulator generating an RF output signal that is a sum of the RF input signals.

14. The system according to claim 13 wherein the delay devices are variable optical true time delay devices.

15. The system according to claim 9 further comprising a phased array antenna connected to said modulators.

16. A method of combining a plurality of RF signals, said method comprising the steps of:
- generating an optical carrier wave;
- directing the carrier wave through a series of optical modulators;
- applying a separate one of the RF signals to each of the optical modulators to modulate the carrier wave, where the modulation of the carrier wave is additive; and
- directing the modulated carrier wave to an optical demodulator to recover the modulation from the carrier wave and provide an RF signal that is the combination of the RF signals.

17. The method according to claim 16 wherein the step of directing the carrier wave through the modulators includes directing the carrier wave through a series of electro-optic phase modulators.

18. A method of combining a plurality of RF signals, said method comprising the steps of:
- generating an optical carrier wave;
- directing the carrier wave through a series of optical modulators;
- applying a separate one of the RF signals to each of the optical modulators to modulate the carrier wave, where the modulation of the carrier wave is additive;
- providing RF phase matching between each optical modulator by positioning a variable optical true time delay device between the phase modulators to delay the optical carrier wave; and
- directing the modulated carrier wave to an optical demodulator to recover the modulation from the carrier wave and provide an RF signal that is the combination of the RF signals.

* * * * *